United States Patent
Okazaki et al.

(10) Patent No.: US 11,071,999 B2
(45) Date of Patent: Jul. 27, 2021

(54) EFFECT PIGMENT DISPERSION

(71) Applicant: KANSAI PAINT CO., LTD., Hyogo (JP)

(72) Inventors: Hirokazu Okazaki, Kanagawa (JP); Masayuki Itoh, Aichi (JP); Tatsuo Kuramochi, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 111 days.

(21) Appl. No.: 16/315,299

(22) PCT Filed: Feb. 6, 2017

(86) PCT No.: PCT/JP2017/004265
§ 371 (c)(1),
(2) Date: Jan. 4, 2019

(87) PCT Pub. No.: WO2018/012014
PCT Pub. Date: Jan. 18, 2018

(65) Prior Publication Data
US 2019/0308217 A1    Oct. 10, 2019

(30) Foreign Application Priority Data

Jul. 13, 2016  (JP) ............................. JP2016-138211
Oct. 7, 2016   (JP) ............................. JP2016-199314

(51) Int. Cl.
| B05D 7/00 | (2006.01) |
| B05D 5/06 | (2006.01) |
| B05D 7/24 | (2006.01) |
| C09D 17/00 | (2006.01) |
| B05D 3/00 | (2006.01) |
| B05D 1/36 | (2006.01) |

(52) U.S. Cl.
CPC ............... B05D 7/572 (2013.01); B05D 1/36 (2013.01); B05D 3/00 (2013.01); B05D 5/06 (2013.01); B05D 7/24 (2013.01); C09D 17/00 (2013.01); C09D 17/001 (2013.01)

(58) Field of Classification Search
None
See application file for complete search history.

(56) References Cited

U.S. PATENT DOCUMENTS

| 5,718,950 A | 2/1998 | Komatsu et al. |
| 6,398,862 B1 | 6/2002 | Hechler et al. |
| 2003/0012950 A1 | 1/2003 | Kieser et al. |
| 2005/0208292 A1* | 9/2005 | Kuramochi ............. B05D 7/53 428/328 |
| 2007/0104874 A1* | 5/2007 | Ogawa ................... B05D 7/542 427/372.2 |
| 2013/0089731 A1 | 4/2013 | Imanaka et al. |
| 2016/0256893 A1* | 9/2016 | Kato ....................... B05D 5/065 |
| 2017/0051150 A1* | 2/2017 | Kawaharada ......... C08G 18/755 |

FOREIGN PATENT DOCUMENTS

| CN | 1227237 | 9/1999 | |
| CN | 1247555 | 3/2000 | |
| CN | 1392202 | 1/2003 | |
| CN | 104910788 | 9/2015 | |
| EP | 0 919 601 | 6/1999 | |
| EP | 3 330 009 | 6/2018 | |
| EP | 3 542 909 | 9/2019 | |
| JP | 8-164358 | 6/1996 | |
| JP | 2002-273335 | 9/2002 | |
| JP | 2003-225610 | 8/2003 | |
| JP | 2009-46660 | 3/2009 | |
| JP | 2011-45805 | 3/2011 | |
| JP | 2016-77998 | 5/2016 | |
| WO | WO-2015166808 A1 * | 11/2015 | ......... C09B 67/0066 |

OTHER PUBLICATIONS

Extended European Search Report dated Feb. 21, 2020 in corresponding European Application No. 17827149.0.
International Search Report dated Mar. 7, 2017 in International (PCT) Application No. PCT/JP2017/004265.
"New breakthrough in the "magic material" developed by Sappi Company and Edinburgh Napier University", China Paper Newsletter, 2016, No. 4, pp. 45-46, with English translation.

* cited by examiner

Primary Examiner — Shamim Ahmed
Assistant Examiner — Bradford M Gates
(74) Attorney, Agent, or Firm — Wenderoth, Lind & Ponack, L.L.P.

(57) ABSTRACT

The present invention relates to an effect pigment dispersion comprising water, a rheology control agent (A), and a flake-effect pigment (B), the flake-effect pigment (B) being an interference pigment in which a transparent or translucent substrate is coated with a metal oxide, and the solids content of the effect pigment dispersion being 0.1 to 15 mass %.

10 Claims, No Drawings

EFFECT PIGMENT DISPERSION

TECHNICAL FIELD

The present invention relates to an effect pigment dispersion.

BACKGROUND ART

The purpose of applying paint is mainly to protect materials and impart an excellent appearance. For industrial products, an excellent appearance, particularly texture, is important in terms of enhancing their product appeal. Although there are various textures for industrial products desired by consumers, luster like pearl ("pearl luster") has recently been desired in the field of exterior automobile panels, automobile components, home electronics, and the like.

Pearl luster is a texture with low graininess, strong multi-reflection of illuminated light, and large variation of luminance depending on the observation angle.

Patent Document 1 discloses a process for forming a multilayer coating film, comprising sequentially forming a colored base coating film containing a titanium white pigment and an aluminum flake adjusted to have a value of N 7 to N 9 in the Munsell color system, a white-pearl or silver-pearl base coating film containing a flake mica powder coated with titanium oxide, and a clear coating film. With the effects of the flake mica powder in the white-pearl or silver-pearl base coating layer, a coating film with pearl luster is obtained. However, depending on the orientation of the flake mica powder in the coating film, the pearl luster may become insufficient due to generation of graininess or the like.

Patent Document 2 discloses a method for forming a pearl luster coating film, comprising forming a colored base coating film layer on a substrate, and then forming an interference clear coating layer containing an interference pigment on the colored base coating film layer, and further forming on it a matte top clear coating layer containing chromatic tinting resin fine particles having a color akin to the interference color of the interference pigment as a matting agent. This invention expresses pearl luster by forming a matte coating film on the top of the layer. However, there is a problem of insufficient luster due to the light scattering inside the matte coating film.

Patent Document 3 discloses a method for forming a coating film, and the method is capable of forming a calming coating film that has high whiteness, a delicate appearance, and a small lightness change from the highlight (near the specular reflection light) to the bottom (in an oblique direction). This method for forming a coating film comprises sequentially forming a color base coating film having a lightness L* in the L*a*b* color space within the range of 75 to 90, a metallic base coating film containing four types of optical interference pigments having different interference colors in the highlight, and a top clear coating film. The presence of multiple types of interference pigments having different interference colors makes it possible to obtain a delicate white-pearl coating color. However, when the titanium oxide-coated alumina flake pigment disclosed in the Examples is used, a problematic increase in graininess occurs.

PATENT DOCUMENTS

Patent Document 1: JPH08-164358A
Patent Document 2: JP2002-273335A
Patent Document 3: JP2011-45805A

SUMMARY OF INVENTION

Technical Problem

An object of the present invention is to provide an effect pigment dispersion capable of forming a coating film that exhibits pearl luster.

Solution to Problem

One embodiment of the present invention provides an effect pigment dispersion comprising water, a rheology control agent (A) and a flake-effect pigment (B), wherein the flake-effect pigment (B) is an interference pigment obtained by coating a transparent or translucent substrate with a metal oxide, and the solids content of the effect pigment dispersion is 0.1 to 15 mass %.

Advantageous Effects of Invention

The effect pigment dispersion of the present invention makes it possible to form a coating film that exhibits pearl luster.

DESCRIPTION OF EMBODIMENTS

In this specification, "pearl luster" is a texture with low graininess, strong multi-reflection of illuminated light, and large variation of luminance depending on the observation angle. The effect pigment dispersion of the present invention is more specifically explained below.

The effect pigment dispersion of the present invention is an effect pigment dispersion comprising water, a rheology control agent (A) and a flake-effect pigment (B), wherein the flake-effect pigment (B) is an interference pigment obtained by coating a transparent or translucent substrate with a metal oxide, and wherein the solids content of the effect pigment dispersion is 0.1 to 15 mass %.

Rheology Control Agent (A)

The rheology control agent (A) used for the effect pigment dispersion of the present invention may be a known rheology control agent. Examples include silica-based fine powder, mineral-based rheology control agents, barium sulfate atomization powder, polyamide-based rheology control agents, organic resin fine particle rheology control agents, diurea-based rheology control agents, urethane association-type rheology control agents, polyacrylic acid-based rheology control agents, which are acrylic swelling-type, cellulose-based rheology control agents, and the like. Of these, in terms of obtaining a coating film with excellent pearl luster, it is particularly preferable to use a mineral-based rheology control agent, a polyacrylic acid-based rheology control agent, or a cellulose-based rheology control agent. A cellulose-based rheology control agent is more particularly preferable. These rheology control agents may be used in a combination of two or more.

Examples of mineral-based rheology control agents include swelling laminar silicate that has a 2:1-type crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; and vermiculite; or substitution products and derivatives thereof, or mixtures thereof.

Examples of polyacrylic acid-based rheology control agents include sodium polyacrylate, polyacrylic acid-(meth) acrylic acid ester copolymers, and the like.

Examples of commercial products of the polyacrylic acid-based rheology control agent include Primal ASE-60, Primal TT615, and Primal RM5 (trade names, produced by The Dow Chemical Company); SN Thickener 613, SN Thickener 618, SN Thickener 630, SN Thickener 634, and SN Thickener 636 (trade names, produced by San Nopco Limited); and the like. The acid value of the solids content of the polyacrylic acid-based rheology control agent may be within the range of 30 to 300 mgKOH/g, and preferably 80 to 280 mgKOH/g.

Examples of cellulose-based rheology control agents include carboxymethylcellulose, methylcellulose, hydroxyethylcellulose, hydroxyethylmethylcellulose, hydroxypropylmethylcellulose, methylcellulose, cellulose nanofibers, cellulose nanocrystals, and the like. Of these, in terms of obtaining a coating film with excellent pearl luster, it is preferable to use cellulose nanofibers.

The cellulose nanofibers may also be referred to as "cellulose nanofibrils," "fibrillated cellulose," or "nanocellulose crystals."

The cellulose nanofiber has a numerical average fiber diameter within the range of preferably 2 to 500 nm, more preferably 2 to 250 nm, even more preferably 2 to 150 nm, in terms of obtaining a coating film with excellent pearl luster.

The cellulose nanofiber also has a numerical average fiber length within the range of preferably 0.1 to 20 µm, more preferably 0.1 to 15 µm, even more preferably 0.1 to 10 µm. The aspect ratio determined by dividing a numerical average fiber length by a numerical average fiber diameter is within the range of preferably 50 to 10000, more preferably 50 to 5000, and even more preferably 50 to 1000.

The numerical average fiber diameter and the numerical average fiber length are measured and calculated from, for example, an image obtained by subjecting a sample (cellulose nanofibers diluted with water) to a dispersion treatment, casting the sample on a grid coated with a carbon film that has been subjected to hydrophilic treatment, and observing the sample with a transmission electron microscope (TEM).

The cellulose nanofibers for use may be those obtained by defibrating a cellulose material and stabilizing it in water. The cellulose material as used here refers to cellulose-main materials in various forms. Specific examples include pulp (e.g., grass plant-derived pulp, such as wood pulp, jute, Manila hemp, and kenaf); natural cellulose, such as cellulose produced by microorganisms; regenerated cellulose obtained by dissolving cellulose in a copper ammonia solution, a solvent of a morpholine derivative, or the like, and subjecting the dissolved cellulose to spinning; and fine cellulose obtained by subjecting the cellulose material to mechanical treatment, such as hydrolysis, alkali hydrolysis, enzymatic decomposition, blasting treatment, vibration ball milling, and the like, to depolymerize the cellulose.

The method for defibrating the cellulose material is not particularly limited, as long as the cellulose material remains in a fibrous form. Examples of the method include mechanical defibration treatment using a homogenizer, a grinder, and the like; chemical treatment using an oxidation catalyst and the like; and biological treatment using microorganisms and the like.

For the cellulose nanofibers, anionically modified cellulose nanofibers may be used. Examples of anionically modified cellulose nanofibers include carboxylated cellulose nanofibers, carboxymethylated cellulose nanofibers, and the like. The anionically modified cellulose nanofibers can be obtained, for example, by incorporating functional groups such as carboxyl groups and carboxymethyl groups into a cellulose material by a known method, washing the obtained modified cellulose to prepare a dispersion of the modified cellulose, and defibrating this dispersion. The carboxylated cellulose is also referred to as "oxidized cellulose."

The oxidized cellulose is obtained, for example, by oxidizing the cellulose material in water using an oxidizing agent in the presence of a compound selected from the group consisting of N-oxyl compounds, bromide, iodide, and mixtures thereof.

The amount of an N-oxyl compound is not particularly limited, as long as the amount is a catalytic amount that can disintegrate cellulose into nanofibers.

The amount of bromide or iodide can be suitably selected within the range in which an oxidation reaction is promoted.

For the oxidizing agent, a known oxidizing agent may be used. Examples include halogen, hypohalous acid, halous acid, perhalogenic acid, salts thereof, halogen oxide, peroxide, and the like. It is preferable to set conditions so that the amount of carboxyl groups in oxidized cellulose is 0.2 mmol/g or more based on the solids content mass of the oxidized cellulose. The amount of carboxyl groups can be adjusted, for example, by performing the following: adjustment of oxidation reaction time; adjustment of oxidation reaction temperature; adjustment of pH in oxidation reaction; and adjustment of the amount of an N-oxyl compound, bromide, iodide, oxidizing agent, or the like.

The carboxymethylated cellulose may be obtained by mixing a cellulose material and a solvent, performing a mercerization treatment using 0.5 to 20-fold moles of alkali hydroxide metal per glucose residue of the cellulose material as a mercerization agent at a reaction temperature of 0 to 70° C. for a reaction time of about 15 minutes to 8 hours, and then adding thereto 0.05 to 10.0-fold moles of a carboxymethylating agent per glucose residue, followed by reaction at a reaction temperature of 30 to 90° C. for a reaction time of about 30 minutes to 10 hours.

The degree of substitution of carboxy methyl per glucose unit in the modified cellulose obtained by introducing carboxymethyl groups into the cellulose material is preferably 0.02 to 0.50.

The thus-obtained anionically modified cellulose can be dispersed in an aqueous solvent to form a dispersion and then defibrated with a disintegrator. The defibration method is not particularly limited. When mechanical defibration is performed, the disintegrator for use may be any of the following: a high-speed shearing disintegrator, a collider disintegrator, a bead mill disintegrator, a high-speed rotating disintegrator, a colloid mill disintegrator, a high-pressure disintegrator, a roll mill disintegrator, and an ultrasonic disintegrator. These disintegrators may be used in a combination of two or more.

Further, cellulose obtained by neutralizing the above oxidized cellulose with a basic neutralizer can also be suitably used as the cellulose-based rheology control agent. Neutralization using such a neutralizer improves the antiwater adhesion of rheology control agents, including cellulose nanofibers. The neutralizer for the oxidized cellulose in the present specification is a neutralizer of an organic base bulkier than inorganic metal salt groups, such as sodium hydroxide. Preferable examples of the neutralizer include organic bases, such as quaternary ammonium salts and amines (primary amine, secondary amine, and tertiary amine). Preferable quaternary ammonium salts are quaternary ammonium hydroxide. Examples of amines include alkylamines and alcoholamines. Examples of alkylamines include N-butylamine, N-octylamine, dibutylamine, triethylamine, and the like. Examples of alcoholamines include N-butyl ethanolamine, N-methyl ethanolamine, 2-amino-2-methyl-1-propanol, dimethylethanolamine, dibutylethanolamine, methyldiethanolamine, and the like.

The content of the neutralizer is not particularly limited, as long as a part or whole of the oxidized cellulose can be neutralized. However, the content of the neutralizer is preferably 0.2 to 1.0 equivalent, in terms of neutralization equivalent based on the contained acid group.

Examples of commercial products of the cellulose nanofibers include Rheocrysta (registered trademark, produced by Dai-Ichi Kogyo Seiyaku Co., Ltd.) and the like.

The content of the rheology control agent (A) in the effect pigment dispersion of the present invention is preferably in the range of 2 to 150 parts by mass, particularly preferably 3 to 120 parts by mass, based on 100 parts by mass of the content of the flake-effect pigment, in terms of obtaining a coating film with excellent metallic luster. Further, rheology control agent (A) is preferably a cellulose-based rheology control agent.

The rheology control agent (A) may be used singly, or in a combination of two or more kinds.

Flake-Effect Pigment (B)

The flake-effect pigment (B) to be used for the effect pigment dispersion of the present invention preferably contains an interference pigment obtained by coating a transparent or translucent substrate with titanium oxide in terms of imparting pearl luster to a multilayer coating film. In this specification, a transparent substrate means a substrate that transmits at least 90% of visible light. A translucent substrate means a substrate that transmits at least 10%, and less than 90% of visible light.

An interference pigment is an effect pigment obtained by coating a surface of a transparent or translucent flake substrate, such as natural mica, synthetic mica, glass, iron oxide, aluminum oxide, or like various metal oxides, with a metal oxide having a refractive index different from that of the substrate. Examples of metal oxides include titanium oxide and iron oxide. The interference pigments express different interference colors depending on the thickness of the metal oxide.

Examples of interference pigment include the following metal oxide-coated mica pigments, metal oxide-coated aluminum flake pigment, metal oxide-coated glass flake pigment, metal oxide-coated silica flake pigment, and the like.

The metal oxide-coated mica pigment is a pigment obtained by coating the surface of a substrate, such as natural mica or synthetic mica, with a metal oxide. Natural mica is a flake substrate obtained by pulverizing mica from ore. Synthetic mica is synthesized by heating an industrial material, such as $SiO_2$, $MgO$, $Al_2O_3$, $K_2SiF_6$, $Na_2SiF_6$ or the like, melting the material at a high temperature of about 1500° C., and cooling the melt for crystallization. When compared with natural mica, synthetic mica contains a smaller amount of impurities and has a more homogeneous size and thickness. Specifically, known examples include fluorophlogopite ($KMg_3AlSi_3O_{10}F_2$), potassium four silicon mica ($KMg_{2.5}AlSi_4O_{10}F_2$), sodium four silicon mica ($NaMg_{2.5}AlSi_4O_{10}F_2$), Na taeniolite ($NaMg_2LiSi_4O_{10}F$), and LiNa taeniolite ($LiMg_2LiSi_4O_{10}F_2$).

Metal oxide-coated alumina flake pigments are pigments obtained by coating the surface of alumina flakes used as a substrate with a metal oxide. Alumina flakes refer to flaky (thin) aluminum oxides, which are transparent and colorless. Alumina flakes do not necessarily consist of only aluminum oxide, and may contain other metal oxides.

Metal oxide-coated glass flake pigments are pigments obtained by coating the surface of a flake glass substrate with a metal oxide. The metal oxide-coated glass flake pigment causes intense light reflection because of its smooth substrate surface.

Metal oxide-coated silica flake pigments are pigments obtained by coating flake silica, which is a substrate having a smooth surface and a uniform thickness, with a metal oxide.

The interference pigments may be those surface-treated to enhance the dispersibility, water resistance, chemical resistance, weatherability, or the like.

The interference pigments are preferably those having an average particle size of 5 to 30 µm, in particular, 7 to 20 µm, in terms of distinctness of image of the coating film to be obtained and superior pearl luster. The particle size as used herein refers to the median size of a volume-based particle size distribution measured by a laser diffraction scattering method using a Microtrack MT3300 particle size distribution analyzer (trade name, produced by Nikkiso Co., Ltd.).

The interference pigments are preferably those having an average particle size of 0.05 to 1.0 µm, in particular, 0.1 to 0.8 µm, in terms of distinctness of image of the coating film to be obtained and superior pearl luster. The thickness as used herein is defined as an average value of 100 or more measured values obtained by observing the cross-section of a coating film comprising the interference pigment by using an optical microscope, and measuring the minor axis of the interference pigment particles by using image-processing software.

The amount of the flake-effect pigment (B) in the effect pigment dispersion of the present invention is preferably 30 to 90 parts by mass, in particular 33 to 85 parts by mass, further preferably 35 to 80 parts by mass, per 100 parts by mass of the total solids of the effect pigment dispersion, in terms of distinctness of image of the coating film to be obtained and superior pearl luster.

Other Components

The effect pigment dispersion of the present invention may contain, in addition to water, the rheology control agent (A), and the flake-effect pigment (B) mentioned above, a surface adjusting agent (C), an organic solvent, a pigment dispersant, an antisettling agent, an antifoaming agent, an ultraviolet absorber, and the like, as necessary.

The surface adjusting agent (C) is used to facilitate uniform orientation of the flake-effect pigment (B) dispersed in water on the substrate when the effect pigment dispersion is applied to the substrate.

The surface adjusting agent (C) is not particularly limited, and any known additive may be used. However, in terms of distinctness of image of the coating film to be obtained and superior pearl luster, it is preferable to use a surface adjusting agent having a contact angle of 8 to 20°, preferably 9 to 19°, and more preferably 10 to 18°, with respect to a tin plate (produced by Paltek Corporation) degreased in advance, the contact angle being measured in such a manner that a liquid that is a mixture of isopropanol, water, and the surface adjusting agent (C) at a ratio of 4.5/95/1 is adjusted to have a viscosity of 150 mPa·s measured with a Brookfield-type viscometer at a rotor rotational speed of 60 rpm at a temperature of 20° C., 10 µL of the liquid is added dropwise to the tin plate, and the contact angle with respect to the tin plate is measured 10 seconds after dropping. The viscosity is controlled by adding Acrysol ASE-60 (trade name, a polyacrylic acid-based rheology control agent, produced by The Dow Chemical Company, solids content: 28%) and dimethylethanolamine.

The 4.5/95/1 ratio, which is the ratio of isopropanol/water/surface adjusting agent (C), corresponds to the component ratio of the effect pigment dispersion (Y) for evaluating the surface adjusting agent. The 150 mPa·s viscosity measured by a Brookfield-type viscometer at a rotor rotational speed of 60 rpm is a normal value during coating to a substrate. Moreover, the 8 to 20° contact angle with respect to the tin plate represents the wet spreading of liquid under standard coating conditions. When the contact angle is 8° or more, the liquid is applied to a substrate without being overly spread; whereas when the contact angle is 20° or less, the liquid is uniformly applied to a substrate without being overly repelled.

Examples of the surface adjusting agent (C) include silicone-based surface adjusting agents, acrylic-based surface adjusting agents, vinyl-based surface adjusting agents, and fluorine-based surface adjusting agents. These surface adjusting agents can be used singly or in a combination of two or more.

Examples of commercial products of the surface adjusting agent (C) include BYK series (produced by BYK-Chemie), Tego series (produced by Evonik), Glanol series and Polyflow series (produced by Kyoeisha Chemical Co., Ltd.), DISPARLON series (produced by Kusumoto Chemicals, Ltd.), and the like.

The surface adjusting agent (C) is preferably a silicone-based surface adjusting agent, in terms of the pearl luster, water resistance, and the like, of the coating film to be obtained. Usable silicone-based surface adjusting agents include polydimethylsiloxane and modified silicone obtained by modifying polydimethylsiloxane. Examples of modified silicone include polyether-modified silicone, acrylic-modified silicone, polyester-modified silicone, and the like.

The dynamic surface tension of the surface adjusting agent (C) is preferably 50 to 70 mN/m, more preferably 53 to 68 mN/m, and even more preferably 55 to 65 mN/m. In this specification, the static surface tension refers to a surface tension value measured by the maximum bubble pressure method at a frequency of 10 Hz. The dynamic surface tension was measured using a SITA measuring apparatus (SITA t60, produced by EKO Instruments).

Further, the static surface tension of the surface adjusting agent (C) is preferably 15 to 30 mN/m, more preferably 18 to 27 mN/m, and further preferably 20 to 24 mN/m. In this specification, the static surface tension refers to a surface tension value measured by the platinum ring method. The static surface tension was measured using a surface tensiometer (DCAT 21, produced by EKO Instruments).

Furthermore, the lamellar length of the surface adjusting agent (C) is preferably 6.0 to 9.0 m, more preferably 6.5 to 8.5 mm, and even more preferably 7.0 to 8.0 mm.

The effect pigment dispersion of the present invention may contain a base resin, a crosslinking agent, and a dispersion resin, in terms of the adhesion and storage stability of the coating film to be obtained. However, the effects of the present invention can be exhibited even if they are not substantially contained.

Examples of the base resin include acrylic resins, polyester resins, alkyd resins, urethane resins, and the like.

Examples of the crosslinking agent include melamine resin, melamine resin derivatives, urea resin, (meth)acrylamide, polyaziridine, polycarbodiimide, and blocked or unblocked polyisocyanate compounds. These may be used singly, or in a combination of two or more.

As the dispersion resin, existing dispersion resins, such as acrylic resins, epoxy resins, polycarboxylic acid resins, and polyester resins, can be used.

When the base resin, the crosslinking agent, the dispersion resin and like resin components are contained in the effect pigment dispersion, the total amount of the base resin, the crosslinking agent, and the dispersion resin, etc. is preferably 0.01 to 500 parts by mass, more preferably 5 to 300 parts by mass, and still more preferably 10 to 200 parts by mass, based on 100 parts by mass of the flake-effect pigment.

The effect pigment dispersion of the present invention may contain, in addition to the flake-effect pigment (B), other flake-effect pigments, coloring pigments, extender pigments, and like pigments, as necessary.

Examples of flake-effect pigments other than the flake-effect pigment (B) include aluminum flake pigments, vapor-deposition metal flake pigments, and the like.

There is no particular limitation on coloring pigments. Specific examples include inorganic pigments, such as complex metal oxide pigments such as titan yellow, transparent iron oxide pigment, and the like; organic pigments, such as azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, indanthrone pigments, dioxazine pigments, threne pigments, and indigo pigments; and carbon black pigments. These pigments may be used solely or in a combination of two or more.

Examples of extender pigments include talc, silica, calcium carbonate, barium sulfate, zinc white (zinc oxide), and the like. These extender pigments may be used solely or in a combination of two or more.

The effect pigment dispersion of the present invention is prepared by mixing and dispersing the above components. In terms of obtaining a coating film with superior pearl luster and low graininess, the solids content during coating is preferably adjusted to 0.1 to 15 mass %, preferably 0.2 to 5.0 mass %, based on the effect pigment dispersion.

In view of obtaining a coating film having superior pearl luster, the proportions (solids contents) of the components of the effect pigment dispersion preferably fall within the following ranges.

Rheology control agent (A): as solids contents, 0.01 to 5 mass %, preferably 0.5 to 3 mass %, more preferably 0.1 to 2 mass %;
Flake-effect pigment (B): 0.1 to 5 mass %, preferably 0.2 to 4.5 mass %, more preferably 0.5 to 4 mass %; and
Surface adjusting agent (C): 0 to 5 mass %, preferably 0 to 3 mass %, more preferably 0.1 to 3 mass %, based on the effect pigment dispersion.

The viscosity (also referred to as "B6 value" in this specification) of the effect pigment dispersion of the present invention at a temperature of 20° C. measured with a Brookfield-type viscometer at 6 rpm after 1 minute is preferably 200 to 8000 mPa·s, in particular, 400 to 6000 mPa·s in terms of obtaining a coating film with excellent pearl luster. The viscometer used in this case is a VDA-type digital Vismetron viscometer (Shibaura System Co. Ltd.; Brookfield-type viscometer).

The viscosity (also referred to as "B60 value" in this specification) of the effect pigment dispersion of the present invention at a temperature of 20° C. measured with a Brookfield-type viscometer at 60 rpm after 1 minute is preferably 50 to 900 mPa·s, in particular, 100 to 800 mPa·s in terms of obtaining a coating film with excellent pearl luster. The viscometer used in this case is a VDA-type digital Vismetron viscometer (Shibaura System Co. Ltd.; Brookfield-type viscometer).

The effect pigment dispersion of the present invention can be applied by a method such as electrostatic spraying, air spray coating, or airless spray coating. In the method for forming a multilayer coating film of the present invention, rotary-atomization-type electrostatic spraying is particularly preferable.

The film thickness 30 seconds after the effect pigment dispersion of the present invention is adhered to the substrate is preferably 3 to 100 µm, more preferably 4 to 80 µm, further preferably 5 to 60 µm, in terms of obtaining a coating film with excellent pearl luster.

The film thickness of a dried effect coating film is preferably 0.1 to 3.0 µm, more preferably 0.3 to 2.5 µm, particularly preferably 0.5 to 2.0 µm, in view of obtaining a coating film having superior pearl luster. In this specification, "dry film thickness" means a thickness of a dried cured film obtained by applying a thermosetting paint or dispersion to form an uncured coating film and subjecting the uncured coating film to a baking treatment. The dry film thickness may be measured, for example, according to JIS K 5600-1-7 (1999).

Substrate

Examples of the substrate to which the effect pigment dispersion of the present invention is applied include metals, such as iron, zinc, and aluminum; metal materials, such as alloys containing these metals; molded products of these metals; molded products of glass, plastic, foam, and the like. Degreasing treatment or surface treatment can be suitably performed depending on these materials to obtain substrates. Examples of the surface treatment include phosphate treatment, chromate treatment, composite oxide treatment, and the like. Furthermore, when the material of the substrate is metal, it is preferable that an undercoating film is formed on a surface-treated metal material using a cationic electrodeposition paint or the like. Moreover, when the material of the substrate is plastic, it is preferable that a primer coating film is formed on a degreased plastic material using a primer paint.

Colored Paint (X)

A colored coating film may be formed by applying a colored paint (X) on the substrate. As the colored paint (X), a known thermosetting paint comprising a vehicle-forming resin, a pigment, and a solvent, such as an organic solvent and/or water, as main components can be specifically used. Examples of the thermosetting paint include intermediate paints, base paints, and the like.

Examples of the vehicle-forming resin used in the colored paint (X) include thermosetting resins, roam-temperature-curable resins, and the like. However, in terms of water resistance, chemical resistance, weather resistance, and the like, thermosetting resins are preferably used. It is preferable to use the vehicle-forming resin in combination with a base resin and a crosslinking agent.

The base resin is preferably a resin that has excellent weather resistance, transparency, and the like. Specific examples include acrylic resins, polyester resins, epoxy resins, urethane resins, and the like.

Examples of acrylic resins include resins obtained by copolymerizing α,β-ethylenically unsaturated carboxylic acids, (meth)acrylic acid esters having a functional group, such as a hydroxyl group, an amide group, or a methylol group, other (meth)acrylic-acid esters, styrene, and the like.

Examples of polyester resins include a polyester resin obtained by a condensation reaction of a polyhydric alcohol, such as ethylene glycol, propylene glycol, butylene glycol, 1,6-hexanediol, trimethylolpropane, and pentaerythritol, with a polyvalent carboxylic acid component, such as adipic acid, isophthalic acid, terephthalic acid, phthalic anhydride, hexahydrophthalic anhydride, and trimellitic anhydride.

Examples of epoxy resins include so-called bisphenol A type epoxy resins produced by the condensation reaction of bisphenol A with epichlorohydrin.

Examples of urethane resins include urethane resins whose molecular weight is increased by reacting an acrylic resin, a polyester resin, or an epoxy resin mentioned above with a diisocyanate compound.

The colored paint (X) may be an aqueous paint, or a solvent-based paint. However, in terms of reducing the VOC of the paint, the colored paint (X) is preferably an aqueous paint. When the colored paint (X) is an aqueous paint, the base resin can be made soluble in water or dispersed in water by using a resin containing a hydrophilic group, such as a carboxyl group, a hydroxyl group, a methylol group, an amino group, a sulfonic acid group, or a polyoxyethylene bond, most generally a carboxyl group, in an amount sufficient for making the resin soluble in water or dispersed in water; and neutralizing the hydrophilic group to form an alkali salt. The amount of the hydrophilic group (e.g., a carboxyl group) used herein is not particularly limited, and can be suitably selected depending on the degree of water solubilization or water dispersion. However, the amount of the hydrophilic group is generally such that the acid value is about 10 or more mgKOH/g, and preferably 30 to 200 mgKOH/g. Examples of the alkaline substance used in neutralization include sodium hydroxide, amine compounds, and the like.

Further, dispersion of the above resin in water can be performed by polymerization of the above monomer components in the presence of a surfactant and a water-soluble resin. Furthermore, the water dispersion can also be obtained by, for example, dispersing the above resin in water in the presence of an emulsifier or the like. In the water dispersion, the base resin may not contain the above hydrophilic group at all, or may contain the above hydrophilic group in an amount less than that of the water-soluble resin.

The crosslinking agent is a component for crosslinking and curing the base resin by heating. Examples include amino resins, polyisocyanate compounds, blocked polyisocyanate compounds, epoxy-containing compounds, carboxy-containing compounds, carbodiimide group-containing compounds, hydrazide group-containing compounds, semicarbazide group-containing compounds, and the like. Preferable among these are amino resins reactive with a hydroxyl group, polyisocyanate compounds, and blocked polyisocyanate compounds; and carbodiimide group-containing compounds reactive with a carboxyl group. These crosslinking agents can be used singly, or in a combination of two or more.

Specifically, amino resins obtained by condensation or co-condensation of formaldehyde with melamine, benzoguanamine, urea, or the like, or further etherification with a lower monohydric alcohol, are suitably used. Further, a polyisocyanate compound can also be suitably used.

The ratio of each component in the colored paint (X) may be freely selected as required. However, in terms of water resistance, appearance, and the like, it is generally preferable that the ratio of the base resin is 60 to 90 mass %, and particularly 70 to 85 mass %, and the ratio of the crosslinking agent is 10 to 40 mass %, and particularly 15 to 30 mass %, both based on the total mass of the base resin and the crosslinking agent.

The pigment gives a certain hue or lightness to a colored coating film formed from the colored paint (X), thereby providing undercoat hiding power.

Examples of the pigment include metallic pigments, rust preventive pigments, coloring pigments, extender pigments, and the like. Of these, coloring pigments are preferably used. There is no particular limitation on coloring pigments. Specific examples thereof include inorganic pigments, such as complex metal oxide pigments such as titan yellow, transparent iron oxide pigment, and the like; organic pigments, such as azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, indanthrone pigments, dioxazine pigments, threne pigments, and indigo pigments; and carbon black pigments. They are arbitrarily used singly or in combination.

Pigments may be used in a suitable combination depending on light transmittance, undercoat hiding power, desired color, and the like. The amount thereof used is suitably an amount in which the light transmittance of a cured coating film having a film thickness of 15 μm formed from the colored paint (X) at a wavelength of 400 to 700 nm is 10% or less, and preferably 5% or less, in terms of undercoat hiding power, weather resistance, and the like.

The light transmittance of the coating film refers to spectral transmittance measured by a recording spectrophotometer (Model EPS-3T, produced by Hitachi, Ltd.) at a wavelength of 400 to 700 nm using, as a sample, a coating film obtained by applying a paint to a glass plate so that the cured coating film has a predetermined film thickness, followed by curing, immersion in warm water at 60 to 70° C., removal of the coating film, and drying. When the values vary depending on the measured wavelengths (400 to 700 nm), the maximum value is used as light transmittance.

An organic solvent may be used for the colored paint (X), if necessary. Specifically, organic solvents generally used for paints can be used. Examples include hydrocarbons, such as toluene, xylene, hexane, and heptane; esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl ether, and diethylene glycol dibutyl ether; alcohols, such as butanol, propanol, octanol, cyclohexanol, and diethylene glycol; ketones, such as methyl ethyl ketone, methyl isobutyl ketone, cyclohexanone, and isophorone; and other organic solvents. These can be used singly, or in a combination of two or more.

Among the above organic solvents, esters, ethers, alcohols, and ketones are preferable in terms of solubility.

The cured film thickness of the colored coating film obtained from the colored paint (X) is 15 μm or more, preferably 15 to 40 μm, and more preferably 15 to 35 μm, in terms of light transmittance, undercoat hiding power, metallic luster, and the like.

Coating of the colored paint (X) can be performed by a general method. When the colored paint (X) is an aqueous paint, for example, deionized water and optionally additives, such as a thickener and an antifoaming agent, are added to the colored paint (X) so that the solids content is adjusted to about 10 to 60 mass % and the viscosity is adjusted to 200 to 5000 cps based on B6 value. Then, the resulting mixture is applied to the substrate surface by spray coating, rotary atomization coating, or the like. An electrostatic charge may be applied, if necessary, during coating.

The film thickness having hiding power of color of the colored paint (X) is preferably 40 μm or less, more preferably 5 to 35 μm, and further preferably 10 to 30 μm, in terms of color stability or the like. In this specification, the "film thickness having hiding power of color" is a value obtained in the following manner. The monochrome checkered hiding power test paper specified in 4.1.2 of JIS K5600-4-1 is attached to a steel plate. Then, the paint is applied by inclined coating so that the film thickness continuously varies, and is dried or cured. The coating surface is then visually observed under diffused daylight, and the minimum film thickness in which the monochrome border of the checker of the hiding power test paper disappears is measured by an electromagnetic film thickness meter. The measured value is the "film thickness having hiding power of color."

The effect pigment dispersion of the present invention is applied on a colored coating film obtained by coating the colored paint (X), thereby forming an effect coating film. The effect pigment dispersion may be applied on a coating film obtained by applying a colored paint, followed by drying or heat curing. However, in view of the adhesion and water resistance of the multilayer coating film, it is preferable to apply the colored paint (X) to form a colored coating film, and apply the effect pigment dispersion on the thus-formed uncured coating film to form an effect coating film.

Further, although the effect coating film formed by applying the effect pigment dispersion of the present invention may be dried or heat-cured, it is preferable to apply a clear paint (Z) onto the uncured effect coating film in view of the adhesion or water resistance of the multilayer coating film.

Clear Paint (Z)

The clear paint (Z) for use may be any of known thermosetting clear-coat paint compositions. Examples of the thermosetting clear-coat paint composition include those containing a base resin having crosslinkable functional groups and a curing agent, such as organic solvent-based thermosetting paint compositions, aqueous thermosetting paint compositions, and powdery thermosetting paint compositions.

Examples of the crosslinkable functional groups contained in the base resin include a carboxyl group, a hydroxy group, an epoxy group, a silanol group, and the like. Examples of the type of the base resin include acrylic resin, polyester resin, alkyd resin, urethane resin, epoxy resin, fluorine resin, and the like. Examples of the curing agent include polyisocyanate compounds, blocked polyisocyanate compounds, melamine resin, urea resin, carboxy-containing compounds, carboxy-containing resin, epoxy-containing resin, epoxy-containing compounds, and the like.

The combination of the base resin and the curing agent for the clear paint (Z) is preferably a carboxy-containing resin and an epoxy-containing resin, a hydroxy-containing resin and a polyisocyanate compound, a hydroxy-containing resin and a blocked polyisocyanate compound, a hydroxy-containing resin and melamine resin, and the like.

Further, the clear paint (Z) may be a one-component paint or a multi-component paint, such as a two-component paint. For all of these paints, the combination of the base resin and the curing agent may be used.

In particular, the clear paint (Z) is preferably a two-component clear paint containing the following hydroxy-containing resin and a polyisocyanate compound, in terms of the adhesion of the obtained coating film.

Hydroxy-Containing Resin

As the hydroxy-containing resin, previously known resins can be used without limitation, as long as they contain hydroxyl groups. Examples of the hydroxy-containing resin include hydroxy-containing acrylic resins, hydroxy-containing polyester resins, hydroxy-containing polyether resins, hydroxy-containing polyurethane resins, and the like; preferably hydroxy-containing acrylic resins and hydroxy-containing polyester resins; and particularly preferably hydroxy-containing acrylic resins.

The hydroxy value of the hydroxy-containing acrylic resin is preferably within the range of 80 to 200 mgKOH/g, and more preferably 100 to 180 mgKOH/g, in terms of obtaining a coating film with excellent scratch resistance and water resistance.

The weight average molecular weight of the hydroxy-containing acrylic resin is preferably within the range of 2500 to 40000, and more preferably 5000 to 30000, in terms of obtaining a coating film with acid resistance and smoothness.

In this specification, the weight average molecular weight refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns: "TSKgel G-4000HXL," "TSKgel G-3000HXL," "TSKgel G-2500HXL," and "TSKgel G-2000HXL" (trade names, all produced by Tosoh Corporation) under the following conditions: mobile phase: tetrahydrofuran, measuring temperature: 40° C., flow rate: 1 cc/min, and detector: RI.

The glass transition temperature of the hydroxy-containing acrylic resin is in a range of −40° C. to 20° C., and particularly preferably −30° C. to 10° C. When the glass transition temperature is −40° C. or more, sufficient coating film hardness is ensured. When the glass transition temperature is 20° C. or less, the coating surface smoothness of the coating film is maintained.

Polyisocyanate Compound

A polyisocyanate compound is a compound having at least two isocyanate groups in one molecule. Examples include aliphatic polyisocyanates, alicyclic polyisocyanates, aliphatic-aromatic polyisocyanates, aromatic polyisocyanates, derivatives of these polyisocyanates, and the like.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and 2,6-diisocyanatomethyl hexanoate (common name: lysine diisocyanate); aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl) cyclohexane (common name: hydrogenated xylylene diisocyanate) or mixtures thereof, and methylenebis(4,1-cyclohexanediyl) diisocyanate (common name: hydrogenated MDI), and norbornane diisocyanate; alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1) heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1) heptane; and the like.

Examples of aliphatic-aromatic polyisocyanates include aliphatic-aromatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aliphatic-aromatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyldiisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4''-triisocyanate, 1,3,5-triisocyanatobenzene, and 2,4,6-triisocyanatotoluene; aromatic tetraisocyanates, such as 4,4'-diphenylmethane-2,2',5,5'-tetraisocyanate; and the like.

Examples of polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), crude TDI, and the like, of the above-mentioned polyisocyanates. These polyisocyanate derivatives may be used singly, or in a combination of two or more.

The above polyisocyanates and derivatives thereof may be used singly, or in a combination of two or more.

Among the aliphatic diisocyanates, hexamethylene diisocyanate compounds are preferably used, and among the alicyclic diisocyanates, 4,4'-methylenebis(cyclohexylisocyanate) is preferably used. Of these, derivatives of hexamethylene diisocyanate are particularly the most preferable, in terms of adhesion, compatibility, and the like.

As the polyisocyanate compound, a prepolymer is also usable that is formed by reacting the polyisocyanate or a derivative thereof with a compound having active hydrogen, such as hydroxy or amino, and reactive to the polyisocyanate under conditions such that the isocyanate groups are present in excess. Examples of the compound reactive to the polyisocyanate include polyhydric alcohols, low-molecular-weight polyester resins, amine, water, and the like.

The polyisocyanate compound for use may be a blocked polyisocyanate compound in which some or all of the isocyanate groups of the above polyisocyanate or a derivative thereof are blocked with a blocking agent.

Examples of the blocking agents include phenols, such as phenol, cresol, xylenol, nitrophenol, ethylphenol, hydroxydiphenyl, butylphenol, isopropylphenol, nonylphenol, octylphenol, and methyl hydroxybenzoate; lactam compounds, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, acetic acid amide, stearic acid amide, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamate esters, such as phenyl N-phenylcarbamate; imines, such as ethyleneimine and propyleneimine; sulfites, such as sodium bisulfite and potassium bisulfite; azole-based compounds; and the like. Examples of the azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

When blocking is performed (a blocking agent is reacted), it can be performed by adding a solvent, if necessary. As the solvent used in the blocking reaction, a solvent that is not reactive with an isocyanate group is preferably used. Examples include ketones, such as acetone and methyl ethyl ketone; esters, such as ethyl acetate; N-methyl-2-pyrrolidone (NMP); and like solvents.

The polyisocyanate compounds can be used singly, or in a combination of two or more. In the present invention, the equivalent ratio of the hydroxy groups in the hydroxy-containing resin to the isocyanate groups in the polyisocyanate compound (OH/NCO) is preferably within the range of 0.5 to 2.0, and more preferably 0.8 to 1.5 in terms of the curability of the coating film, scratch resistance, and the like.

When a two-component clear paint containing a hydroxy-containing resin and an isocyanate-containing compound is used as the clear paint (Z), a state in which the hydroxy-containing resin and the polyisocyanate compound are separately present is preferable in terms of storage stability. They are mixed and prepared into a two-component composition immediately before use.

The clear paint (Z) may further suitably contain additives, such as a solvent (e.g., water and organic solvents), a curing catalyst, an antifoaming agent, and an ultraviolet absorber, if necessary.

The clear paint (Z) may suitably contain a color pigment within a range that does not impair transparency. As the color pigment, conventionally known pigments for ink or paints-can be used singly, or in a combination of two or more. The amount thereof to be added may be suitably determined, but is 30 parts by mass or less, and more preferably 0.01 to 10 parts by mass, based on 100 parts by mass of the vehicle-forming resin composition contained in the clear paint (Z).

The form of the clear paint (Z) is not particularly limited. The clear paint (Z) is generally used as an organic solvent-based paint. Examples of the organic solvent used in this case include various organic solvents for paints, such as aromatic or aliphatic hydrocarbon solvents, ester solvents, ketone solvents, ether solvents, and the like. As the organic solvent used here, the one used in the preparation of the hydroxy-containing resin may be used as is, or other organic solvents may be further suitably added.

The solids concentration of the clear paint (Z) is preferably about 30 to 70 mass %, and more preferably about 40 to 60 mass %.

The clear paint (Z) is applied to the effect coating film. The coating of the clear paint (Z) is not particularly limited, and the same method as those for the colored paint may be used. For example, the clear paint (Z) can be applied by a coating method, such as air spray coating, airless spray coating, rotary atomization coating, or curtain coating. In these coating methods, an electrostatic charge may be applied, if necessary. Among these, rotary atomization coating using an electrostatic charge is preferable. The coating amount of the clear paint (Z) is generally preferably an amount in which the cured film thickness is about 10 to 50 μm.

Moreover, when the clear paint (Z) is applied, it is preferable to suitably adjust the viscosity of the clear paint (Z) within a viscosity range suitable for the coating method. For example, for rotary atomization coating using an electrostatic charge, it is preferable to suitably adjust the viscosity of the clear paint (Z) within the range of about 15 to 60 seconds measured by a Ford cup No. 4 viscometer at 20° C. using a solvent, such as an organic solvent.

In the present invention, the uncured colored coating film, the uncured effect coating film, and the uncured clear coating film are heated to simultaneously cure these three coating films. Heating can be performed by a known means. For example, a drying furnace, such as a hot-blast furnace, an electric furnace, or an infrared beam heating furnace, can be used. The heating temperature is preferably within the range of 70 to 150° C., and more preferably 80 to 140° C. The heating time is not particularly limited, but is preferably within the range of 10 to 40 minutes, and more preferably 20 to 30 minutes.

In a multilayer coating film forming method in which a colored paint (X) is applied to form a colored coating film, the effect pigment dispersion of the present invention is applied onto the formed colored coating film to form an effect coating film, and a clear paint (Z) is applied onto the formed effect coating film to form a clear coating film, the multilayer coating film to be obtained is such that a value Y5/Y10, which is obtained by dividing a value Y (Y5) representing a luminance in the XYZ color space based on the spectral reflectance of light illuminated at an angle of 45 degrees with respect to the coating film and received at an angle of 5 degrees deviated from the specular reflection light in the incident light direction by a value Y (Y10) representing a luminance in the XYZ color space based on the spectral reflectance of light illuminated at an angle of 45 degrees with respect to the coating film and received at an angle of 10 degrees deviated from the specular reflection light in the incident light direction, falls within a range of 1.5 to 3.0, preferably 1.6 to 3.0, further preferably 1.7 to 3.0, and that the HG value, which is a parameter of microscopic brilliance, is 20 to 60, preferably 20 to 58, and further preferably 20 to 55. When the value Y5/Y10 is not less than 1.5 and less than 3.0, the multiple reflection light of the illuminated light becomes strong, and the luminance greatly varies depending on the observation angle. By satisfying Y5/Y10 of 1.5 to 3.0 and HG of 20 to 60, the multilayer coating film has a superior pearl luster.

The "Examples" section below has definitions of Y5, Y10, and HG.

For the multilayer coating film obtained from the colored coating film, the effect coating film, and the clear coating film, it is preferable, in terms of the adhesion and water resistance of the multilayer coating film, to apply a colored paint (X) to form a colored coating film, apply the effect pigment dispersion onto the formed uncured coating film to form an effect coating film, apply a clear paint (Z) onto the formed uncured effect coating film to form an uncured clear coating film, and simultaneously cure these three uncured coating films by heating.

EXAMPLES

The present invention is more specifically explained below in reference to Examples and Comparative Examples. However, the present invention is not limited to the following Examples. In the following Examples, "part (s)" and "%" are based on mass.

Production Example 1: Production of Hydroxyl-Containing Acrylic Resin 50 parts of ethylene glycol monoethyl ether acetate was placed in a reaction vessel equipped with a thermometer, a thermostat, a stirrer, a reflux condenser, and a dropping funnel, and stirred and mixed. The mixture was heated to 135° C. Subsequently, a mixture of monomer/polymerization initiator described below was added dropwise over 3 hours to the reaction vessel maintained at the same temperature. After the completion of the dropwise addition, the mixture was aged for 1 hour. Thereafter, a mixture comprising 10 parts of ethylene glycol monoethyl ether acetate and 0.6 part of 2,2'-azobis(2-methylpropionitrile) was added dropwise to the reaction product over 1 hour and 30 minutes while maintaining the same temperature, and the resulting product was aged for another 2 hours. Then, the ethylene glycol monoethyl ether acetate was distilled off under reduced pressure, thereby obtaining a hydroxyl-containing acrylic resin having a hydroxyl value of 54 mg KOH/g, a number average molecular weight of 20,000, and a resin solids content of 65 mass %. The term "number average molecular weight" used herein represents a value determined by gel permeation chromatography (GPC) using the calibration curve of standard polystyrene.
Mixture of Monomer/Polymerization Initiator:
a mixture comprising 38 parts of methyl methacrylate, 17 parts of ethyl acrylate, 17 parts of n-butyl acrylate, 7 parts of hydroxyethyl methacrylate, 20 parts of lauryl methacrylate, and 1 part of acrylic acid; and 2 parts of 2,2'-azobis(2-methylpropionitrile).

Production Example 2: Production of Water-Soluble Acrylic Resin 35 parts of propylene glycol monopropyl ether was placed in a reaction vessel equipped with a thermometer, a thermostat, a stirrer, a reflux condenser, and a dropping funnel, and heated to 85° C. Thereafter, a mixture of 30 parts of methyl methacrylate, 20 parts of 2-ethylhexyl acrylate, 29 parts of n-butyl acrylate, 15 parts of hydroxyethyl acrylate, 6 parts of acrylic acid, 15 parts of propylene glycol monopropyl ether, and 2.3 parts of 2,2'-azobis(2,4-dimethylvaleronitrile) was added dropwise over a period of 4 hours, and aged for 1 hour after completion of the dropping. Thereafter, a mixture of 10 parts of propylene glycol monopropyl ether and 1 part of 2,2'-azobis(2,4-dimethylvaleronitrile) was then further added dropwise to the reaction vessel over 1 hour, and aged for 1 hour after completion of the dropping. Further, 7.4 parts of diethanolamine was added, thereby obtaining a water-soluble acrylic resin solution having a solids content of 55%, a weight-average molecular weight of 58,000, an acid value of 47 mgKOH/g, and a hydroxy value of 72 mg KOH/g.

Production Example 3: Production of Red Pigment Dispersion 180 parts (solids content=100 parts) of the water-soluble acrylic resin solution obtained in Production Example 2, 100 parts of PERRINDO(®) MAROON 179 229-6438 (trade name, DIC Corporation, a condensed polycyclic perylene organic red pigment), and 440 parts of deionized water were placed in a stirring and mixing container, and uniformly mixed. Subsequently, the obtained mixed liquid was placed in a wide-mouthed glass bottle having a capacity of 225 cc. Zirconia beads having a diameter of about 0.5 mm were added to the bottle as dispersion media, and the bottle was hermetically sealed. The mixture was dispersed for 5 hours in a paint shaker, thereby obtaining a red pigment dispersion having a solids content of 27.8 mass %.

Production Example 4: Production of Blue Pigment Dispersion 180 parts (solids content=100 parts) of the water-soluble acrylic resin solution obtained in Production Example 2, 100 parts of Cyanine Blue 5206 (trade name, Dainichiseika Color & Chemicals Mfg. Co., Ltd., an organic blue pigment), and 440 parts of deionized water were placed in a stirring and mixing container, and uniformly mixed. Subsequently, the obtained mixed liquid was placed in a wide-mouthed glass bottle having a capacity of 225 cc. Zirconia beads having a diameter of about 0.5 mm were added to the bottle as dispersion media, and the bottle was hermetically sealed. The mixture was dispersed for 5 hours in a paint shaker, thereby obtaining a blue pigment dispersion having a solids content of 27.8 mass %.

Example 1: Preparation of Effect Pigment Dispersion (Y-1)

50.0 parts (0.25 parts as solids content) of rheology control agent (A-1) (trade name: Rheocrysta, solids content=0.5%, a cellulose nanofiber dispersed in water, produced by Dai-Ichi Kogyo Seiyaku Co., Ltd.), 50.0 parts of distilled water, 0.5 parts (0.5 parts as solids content) of surface adjusting agent (C-1)(Note 1), 3.8 parts (3.8 parts as solids content) of Xirallic(®) Crystal Silver (trade name: T60-10, titanium oxide-coated alumina flake pigment, Merck & Co., Inc.), 0.005 parts of dimethylethanolamine, and 0.5 parts of ethylene glycol monobutyl ether were added, stirred, and mixed, thereby obtaining an effect pigment dispersion (Y-1).

Note 1: Surface adjusting agent (C-1): A contact angle=13°, dynamic surface tension (mN/m)=63.9, static surface tension (mN/m)=22.2, lamella length=7.45 mm, and solids content=100 mass %. The contact angle refers to a contact angle with respect to a tin plate, the contact angle being measured in such a manner that a liquid that was a mixture of isopropanol, water, and the surface adjusting agent (C-1) at a ratio of 4.5/95/1 was adjusted to have a viscosity of 100 mPa·s measured with a Brookfield-type viscometer at a rotor rotational speed of 60 rpm at a temperature of 20° C., 10 μL of the liquid was added dropwise to a tin plate (produced by Paltek Corporation) degreased in advance, and the contact angle with respect to the tin plate was measured 10 seconds after the dropwise addition with a contact angle meter (CA-X150, trade name, produced by Kyowa Interface Science Co., Ltd.).

Product Name: BYK348, BYK, Silicone-Based Surface adjusting agent

Examples 2 to 17 and Comparative Example 11:
Preparation of Effect Pigment Dispersions (Y-2) to (Y-17) and (Y-18)

Effect pigment dispersions (Y-2) to (Y-18) were obtained in the same manner as in Example 1, except that the formulations shown in Table 1 were used.

Nanofibers obtained by oxidizing by a catalyst TEMPO (2,2,6,6-tetramethylpiperidine 1-oxyl radical) and passing cellulose through an ion exchange column for neutralization with dibutylamine were used as the rheology control agent (A-2) in Example 17. Solids content: 2 mass %.

The notes shown in the tables refer to the following. Note 2: Surface adjusting agent (C-2): A contact angle=14°, dynamic surface tension (mN/m)=68.7, static surface tension (mN/m)=21.9, lamella length=7.46 mm, and solids content=85 mass %. The contact angle refers to a contact angle with respect to a tin plate, the contact angle being measured in such a manner that a liquid that was a mixture of isopropanol, water, and the surface adjusting agent (C-2) at a ratio of 4.5/95/1 was adjusted to have a viscosity of 100 mPa·s measured with a Brookfield-type viscometer at a rotor rotational speed of 60 rpm at a temperature of 20° C., 10 μL of the liquid was added dropwise to a tin plate (produced by Paltek Corporation) degreased in advance, and the contact angle with respect to the tin plate was measured 10 seconds after the dropwise addition with a contact angle meter (CA-X150, trade name, produced by Kyowa Interface Science Co., Ltd.).

Product Name: BYK347, BYK, Silicone-Based Surface adjusting agent

The viscosity of the obtained effect pigment dispersion at a rotational s of 60 rpm was measured. Table 1 shows the results (B60 viscosity).

In this specification, the viscosity is a value obtained by adjusting the sample temperature to 25° C., and measuring the viscosity using a VDA-type digital Vismetron viscometer (Shibaura System Co., Ltd.).

TABLE 1

| | | | Production Ex. No. | | | | | | | | |
|---|---|---|---|---|---|---|---|---|---|---|---|
| | | | Ex. 1 | Ex. 2 | Ex. 3 | Ex. 4 | Ex. 5 | Ex. 6 | Ex. 7 | Ex. 8 | Ex. 9 |
| | | | Effect Pigment Dispersion | | | | | | | | |
| | | | Y-1 | Y-2 | Y-3 | Y-4 | Y-5 | Y-6 | Y-7 | Y-8 | Y-9 |
| Composition | Distilled Water | | 50.0 | 35.0 | 35.0 | 42.0 | 50.0 | 50.0 | 50.0 | 50.0 | 50.0 |
| | Rheology Control Agent (A-1) | | 50.0 | 65.0 | 65.0 | 58.0 | 50.0 | 50.0 | 50.0 | 50.0 | 50.0 |
| | Rheology Control Agent (A-2) | | | | | | | | | | |
| | Flake-Effect Pigment | A | 3.8 | 2.1 | 1.5 | | | | | | |
| | | B | | | | 2.3 | | | | | |
| | | C | | | | | 5.0 | 2.5 | | | |
| | | D | | | | | | | 1.8 | | |
| | | E | | | | | | | | 2.0 | |
| | | F | | | | | | | | | 2.0 |
| | | G | | | | | | | | | |
| | | H | | | | | | | | | |
| | | I | | | | | | | | | |
| | Red Pigment Dispersion | | | | | | | | | | |
| | Blue Pigment Dispersion | | | | | | | | | | |
| | Surface Adjusting Agent (C-1) (Note 1) | | 0.5 | 0.5 | 0.5 | 2.1 | 0.5 | 0.5 | 0.5 | 0.5 | 0.5 |
| | Surface Adjusting Agent (C-2) (Note 1) | | | | | | | | | | |

TABLE 1-continued

| | | | | | | | | | | |
|---|---|---|---|---|---|---|---|---|---|---|
| | Dimethylethanolamine | 0.005 | 0.005 | 0.005 | 0.005 | 0.005 | 0.005 | 0.005 | 0.005 | 0.005 |
| | Ethylene Glycol Monobutyl Ether | 0.5 | 0.5 | 0.5 | 0.5 | 0.5 | 0.5 | 0.5 | 0.5 | 0.5 |
| Characteristic Values of Effect Pigment Dispersion | B60 Viscosity | 266 | 332 | 282 | 236 | 268 | 208 | 322 | 301 | 311 |
| | Solids Content Mass % | 4.3 | 2.8 | 2.3 | 4.5 | 5.4 | 3.1 | 2.5 | 2.7 | 2.7 |

| | | | Production Ex. No. | | | | | | | | |
|---|---|---|---|---|---|---|---|---|---|---|---|
| | | | Ex. 10 | Ex. 11 | Ex. 12 | Ex. 13 | Ex. 14 | Ex. 15 | Ex. 16 | Ex. 17 | Co. Ex. 11 |
| | | | Effect Pigment Dispersion | | | | | | | | |
| | | | Y-10 | Y-11 | Y-12 | Y-13 | Y-14 | Y-15 | Y-16 | Y-17 | Y-18 |
| Composition | Distilled Water | | 50.0 | 35.0 | 40.0 | 35.0 | 35.0 | 35.0 | 35.0 | 35.0 | 35.0 |
| | Rheology Control Agent (A-1) | | 50.0 | 65.0 | 60.0 | 65.0 | 65.0 | 65.0 | 65.0 | | 65.0 |
| | Rheology Control Agent (A-2) | | | | | | | | | 65.0 | |
| | Flake-Effect Pigment | A | | | | 2.1 | 2.1 | 2.1 | 2.1 | 2.1 | 16.8 |
| | | B | | | | | | | | | |
| | | C | | | | | | | | | |
| | | D | | | | | | | | | |
| | | E | | | | | | | | | |
| | | F | | | | | | | | | |
| | | G | 2.0 | | | | | | | | |
| | | H | | 1.4 | | | | | | | |
| | | I | | | 1.7 | | | | | | |
| | Red Pigment Dispersion | | | | | | | | 3.5 | | |
| | Blue Pigment Dispersion | | | | | | | | | 3.5 | |
| | Surface Adjusting Agent (C-1) (Note 1) | | 0.5 | 0.5 | 0.5 | | | 0.5 | 0.5 | 0.5 | 2.0 |
| | Surface Adjusting Agent (C-2) (Note 1) | | | | | | 0.6 | | | | |
| | Dimethylethanolamine | | 0.005 | 0.005 | 0.005 | 0.005 | 0.005 | 0.005 | 0.005 | 0.005 | 0.005 |
| | Ethylene Glycol Monobutyl Ether | | 0.5 | 0.5 | 0.5 | 0.5 | 0.5 | 0.5 | 0.5 | 0.5 | 0.5 |
| Characteristic Values of Effect Pigment Dispersion | B60 Viscosity | | 323 | 314 | 264 | 270 | 265 | 285 | 273 | 332 | 350 |
| | Solids Content Mass % | | 2.7 | 2.1 | 2.5 | 2.4 | 2.8 | 3.7 | 3.7 | 2.8 | 16.0 |

Flake-Effect Pigment A: Xirallio ® T60-10 Crystal Silver (Trade Name, Titanium Oxide-Coated Alumina Flake Pigment, Merck & Co., Inc., Primary Average Particle Size = 18.5 μm)
Flake-Effect Pigment B: Xirallio ® T61-10 Micro Silver (Trade Name, Titanium Oxide-Coated Alumina Flake Pigment, Merck & Co., Inc., Primary Average Particle Size = 11.8 μm)
Flake-Effect Pigment C: TWINCLEPEARL ® SMC-SO (Trade Name, Titanium Oxide-Coated Synthetic Mica Pigment, Nihon Koken Kogyo Co., Ltd., Primary Average Particle Size = 15.5 μm)
Flake-Effect Pigment D: Iriodin ® 121 RUTILE LUSTRE SATIN (Trade Name, Titanium Oxide-Coated Mica Pigment, Merck & Co., Inc., Primary Average Particle Size = 9.7 μm)
Flake-Effect Pigment E: Xirallio ® T60-23 Galaxy Blue (Trade Name, Titanium Oxide-Coated Alumina Flake Pigment, Merck & Co., Inc., Primary Average Particle Size = 19.4 μm)
Flake-Effect Pigment F: Xirallio ® T60-21 Solaris Red (Trade Name, Titanium Oxide-Coated Alumina Flake Pigment, Merck & Co., Inc., Primary Average Particle Size = 19.2 μm)
Flake-Effect Pigment G: Xirallio ® T60-20 Sunbeam Gold (Trade Name, Titanium Oxide-Coated Alumina Flake Pigment, Merck & Co., Inc., Primary Average Particle Size = 17.7 μm)
Flake-Effect Pigment H: Colorstream ® T20-04 Lapis Sunlight (Trade Name, Titanium Oxide-Coated Silica Flake Pigment, Merck & Co., Inc., Primary Average Particle Size = 15.9 μm)
Flake-Effect Pigment I: Pyrisma ® M40-58 Arbercup Orange (Trade Name, Titanium Oxide-Coated Mica Pigment, Merck & Co., Inc., Primary Average Particle Size = 17.1 μm Average Thickness = 0.65 μm)

Comparative Examples 1 to 10: Preparation of Paint Compositions (B-1) to (B-10)

Flake-effect pigments in the formulations shown in Table 2 were individually mixed by stirring with 100 parts (solids content) of a resin component containing 75 parts (solids content) of the hydroxy-containing acrylic resin obtained in Production Example 1, and 25 parts (solids content) of U-Van 28-60 (trade name, butyl etherified melamine resin, produced by Mitsui Chemicals, Inc.). Each of the mixtures was diluted and adjusted to have the solids content shown in Table 2, thereby preparing paint compositions (B-1) to (B-10) to be used for Comparative Examples 1 to 10. In Comparative Example 10, water, ASE-60, and dimethylethanolamine were added and the solids content was adjusted to 5.0 mass % of the paint composition.

The flake-effect pigments A to I are the same as those above.

bell-shaped coating device. After the resulting film was allowed to stand for 3 minutes, preheating was performed at 80° C. for 3 minutes. Further, the effect pigment dispersion (Y-1) produced as described above was applied on it to a dry coating film thickness of 1.0 μm using a robot bell (produced by ABB) at a booth temperature of 23° C. and at a humidity of 68%.

The resulting coating was then allowed to stand for 3 minutes at room temperature and heated for 3 minutes at 80° C. using a hot-air-circulation-type dryer. Subsequently, a clear paint (Z-1) "KINO6500" (trade name, produced by Kansai Paint Co., Ltd., a hydroxy/isocyanate curable acrylic resin/urethane resin-based two-component organic solvent-based paint) was applied thereto to a dry coating film thickness of 30 μm using a robot bell (produced by ABB) at a booth temperature of 23° C. and at a humidity of 68%. After coating, the resulting plate was allowed to stand at room temperature for 10 minutes, and then heated in a

TABLE 2

| | | Production Ex. No. | | | | | | | | | |
|---|---|---|---|---|---|---|---|---|---|---|---|
| | | Co. Ex. 1 | Co. Ex. 2 | Co. Ex. 3 | Co. Ex. 4 | Co. Ex. 5 | Co. Ex. 6 | Co. Ex. 7 | Co. Ex. 8 | Co. Ex. 9 | Co. Ex. 10 |
| | | Name of Paint Composition | | | | | | | | | |
| | | B-1 | B-2 | B-3 | B-4 | B-5 | B-6 | B-7 | B-8 | B-9 | B-10 |
| Hydroxy-Containing Acrylic Resin | | 75.0 | 75.0 | 75.0 | 75.0 | 75.0 | 75.0 | 75.0 | 75.0 | 75.0 | 75.0 |
| U-Van 28-60 | | 25.0 | 25.0 | 25.0 | 25.0 | 25.0 | 25.0 | 25.0 | 25.0 | 25.0 | 25.0 |
| Flake-Effect Pigment | A | 7.1 | | | | | | | | | 7.1 |
| | B | | 8.3 | | | | | | | | |
| | C | | | 8.2 | | | | | | | |
| | D | | | | 6.4 | | | | | | |
| | E | | | | | 7.6 | | | | | |
| | F | | | | | | 6.8 | | | | |
| | G | | | | | | | 7.0 | | | |
| | H | | | | | | | | 3.4 | | |
| | I | | | | | | | | | 6.4 | |
| Solids Content Mass % | | 27.7 | 27.9 | 27.9 | 27.6 | 27.8 | 27.7 | 27.7 | 27.0 | 27.6 | 5.0 |

Flake-Effect Pigment: A: Xirallio ® T60-10 Crystal Silver (Trade Name, Titanium Oxide-Coated Alumina Flake Pigment, Merck & Co., Inc., Primary Average Particle Size = 18.5 μm)
Flake-Effect Pigment: B: Xirallio ® T61-10 Micro Silver (Trade Name, Titanium Oxide-Coated Alumina Flake Pigment, Merck & Co., Inc., Primary Average Particle Size = 11.8 μm)
Flake-Effect Pigment: C: TWINCLEPEARL ® SMC-SO (Trade Name, Titanium Oxide-Coated Synthetic Mica Pigment, Nihon Koken Kogyo Co., Ltd., Primary Average Particle Size = 15.5 μm)
Flake-Effect Pigment: D: Iriodin ® 121 RUTILE LUSTRE SATIN (Trade Name, Titanium Oxide-Coated Mica Pigment, Merck & Co., Inc., Primary Average Particle Size = 9.7 μm)
Flake-Effect Pigment: E: Xirallio ® T60-23 Galaxy Blue (Trade Name, Titanium Oxide-Coated Alumina Flake Pigment, Merck & Co., Inc., Primary Average Particle Size = 19.4 μm)
Flake-Effect Pigment: F: Xirallio ® T60-21 Solaris Red (Trade Name, Titanium Oxide-Coated Alumina Flake Pigment, Merck & Co., Inc., Primary Average Particle Size = 19.2 μm)
Flake-Effect Pigment: G: Xirallio ® T60-20 Sorbeam Gold (Trade Name, Titanium Oxide-Coated Alumina Flake Pigment, Merck & Co., Inc., Primary Average Particle Size = 17.7 μm)
Flake-Effect Pigment: H: Colorstream ® T20-04 Lapis Sunlight (Trade Name, Titanium Oxide-Coated Silica Pigment, Merck & Co., Inc., Primary Average Particle Size = 15.9 μm)
Flake-Effect Pigment: I: Pyrisma ® M40-58 Arbercup Orange (Trade Name, Titanium Oxide-Coated Mica Pigment, Merck & Co., Inc., Primary Average Particle Size = 17.1 μm)

Production of Test Plate

Example 18

A cationic electrodeposition paint "Elecron 9400HB" (trade name, produced by Kansai Paint Co., Ltd., an amine-modified epoxy resin-based cationic resin containing a blocked polyisocyanate compound as a curing agent) was applied by electrodeposition to a degreased and zinc phosphate-treated steel plate (JISG3141, size: 400×300×0.8 ma) to a film thickness of 20 μm when cured. The resulting film was heated at 170° C. for 20 minutes to be cured by crosslinking, thereby obtaining a substrate 1.

A colored paint (X-1) "WP-522H" (trade name, produced by Kansai Paint Co., Ltd., a polyester resin-based aqueous intermediate paint, L* value of the coating film to be obtained: 90.86, a* value of the coating film to be obtained: −0.88, b* value of the coating film to be obtained: 0.27) was applied to the substrate 1 to a cured film thickness of 30 μm by electrostatic spraying using a rotary-atomization-type hot-air-circulation-type dryer at 140° C. for 30 minutes to simultaneously dry the multilayer coating films, thereby obtaining a test plate.

The film thickness of the dry coating film of the effect pigment dispersion was calculated from the following formula. The same calculation was used in the following Examples.

$$x = (sc*10000)/(S*sg)$$

x: film thickness [μm]
sc: coating solids content [g]
S: evaluation area of coating solids content [cm$^2$]
sg: coating film specific gravity [g/cm$^3$]

Examples 19 to 34 and Comparative Example 22

The test plates of Examples 19 to 34 and Comparative Example 22 were obtained in the same manner as in Example 18, except that the color of the colored coating film, the type of the effect pigment dispersion and the film thickness used in Example 18 were changed to those shown in Table 3.

TABLE 3

| | | Example No. | | | | | | | | |
|---|---|---|---|---|---|---|---|---|---|---|
| | | Ex. 18 | Ex. 19 | Ex. 20 | Ex. 21 | Ex. 22 | Ex. 23 | Ex. 24 | Ex. 25 | Ex. 26 |
| | | Effect Pigment Dispersion | | | | | | | | |
| | | Y-1 | Y-2 | Y-3 | Y-4 | Y-5 | Y-6 | Y-7 | Y-8 | Y-9 |
| Color of Colored Coating Film Obtained by Applying Colored Paint (X) | $L^*$ | 90.86 | 90.86 | 90.86 | 90.86 | 90.86 | 90.86 | 90.86 | 85.42 | 62.73 |
| | $a^*$ | −0.88 | −0.88 | −0.88 | −0.88 | −0.88 | −0.88 | −0.88 | −6.32 | 40.87 |
| | $b^*$ | 0.27 | 0.27 | 0.27 | 0.27 | 0.27 | 0.27 | 0.27 | −3.00 | −7.58 |
| Film Thickness of Effect Pigment Dispersion (μm) | | 1.0 | 0.8 | 0.9 | 1.1 | 1.5 | 0.9 | 0.9 | 0.9 | 0.9 |
| Y5 Value | | 728 | 713 | 900 | 563 | 744 | 767 | 451 | 283 | 432 |
| Y10 Value | | 392 | 268 | 316 | 344 | 465 | 362 | 292 | 182 | 204 |
| Y5/Y10 | | 1.86 | 2.67 | 2.85 | 1.64 | 1.60 | 2.12 | 1.54 | 1.55 | 2.12 |
| HG Value | | 57.7 | 47.8 | 49.6 | 30.5 | 58.7 | 59.9 | 29.2 | 31.1 | 32.3 |

| | | Example No. | | | | | | | | |
|---|---|---|---|---|---|---|---|---|---|---|
| | | Ex. 27 | Ex. 28 | Ex. 29 | Ex. 30 | Ex. 31 | Ex. 32 | Ex. 33 | Ex. 34 | Co. Ex. 22 |
| | | Effect Pigment Dispersion | | | | | | | | |
| | | Y-10 | Y-11 | Y-12 | Y-13 | Y-14 | Y-15 | Y-16 | Y-17 | Y-18 |
| Color of Colored Coating Film Obtained by Applying Colored Paint (X) | $L^*$ | 87.58 | 89.32 | 52.37 | 90.86 | 90.86 | 52.37 | 85.42 | 90.86 | 90.86 |
| | $a^*$ | −9.04 | −8.38 | 52.54 | −0.88 | −0.88 | 52.54 | −6.32 | −0.88 | −0.88 |
| | $b^*$ | 53.23 | −9.68 | 53.91 | 0.27 | 0.27 | 53.91 | −3.00 | 0.27 | 0.27 |
| Film Thickness of Effect Pigment Dispersion (μm) | | 1.0 | 0.6 | 0.9 | 0.8 | 0.8 | 0.9 | 0.9 | 0.8 | 1.0 |
| Y5 Value | | 532 | 524 | 221 | 632 | 720 | 251 | 303 | 702 | 410 |
| Y10 Value | | 340 | 292 | 106 | 393 | 262 | 121 | 192 | 273 | 328 |
| Y5/Y10 | | 1.56 | 1.79 | 2.11 | 1.61 | 2.75 | 2.07 | 1.58 | 2.67 | 1.25 |
| HG Value | | 31.4 | 47.0 | 59.3 | 51.2 | 47.5 | 56.2 | 34.5 | 47.7 | 71.5 |

Comparative Example 12

A colored paint (X-1) "WP-522H" (trade name, produced by Kansai Paint Co., Ltd., a polyester resin-based aqueous intermediate paint, L* value of the coating film to be obtained: 90.86, a* value of the coating film to be obtained: −0.88, b* value of the coating film to be obtained: 0.27) was applied to the substrate 1 to a cured film thickness of 30 μm by electrostatic spraying using a rotary-atomization-type bell-shaped coating device. After the resulting film was allowed to stand for 3 minutes, preheating was performed at 80° C. for 3 minutes. Further, the paint composition (B-1) produced as described above was applied on it to a dry coating film thickness of 15 μm using a robot bell (produced by ABB) at a booth temperature of 23° C. and at a humidity of 68%. The resulting coating was then allowed to stand for 10 minutes at room temperature, and a clear paint (Z-1) "KINO6500" (trade name, produced by Kansai Paint Co., Ltd., a hydroxy/isocyanate curable acrylic resin/urethane resin-based two-component organic solvent-based paint) was applied to the dry coated surface to a dry coating film thickness of 30 μm using a robot bell (produced by ABB) at a booth temperature of 23° C. and at a humidity of 68%. After coating, the resulting plate was allowed to stand at room temperature for 15 minutes, and then heated in a hot-air-circulation-type dryer at 140° C. for 30 minutes to simultaneously dry the multilayer coating films, thereby obtaining a test plate.

Comparative Examples 13 to 21

The test plates of Comparative Examples 13 to 21 were obtained in the same manner as in Comparative Example 12, except that the color of the colored coating film and the type of the paint composition used in Comparative Example 12 were changed to those shown in Table 4.

TABLE 4

| | | Example No. | | | | | | | | | |
|---|---|---|---|---|---|---|---|---|---|---|---|
| | | Co. Ex. 12 | Co. Ex. 13 | Co. Ex. 14 | Co. Ex. 15 | Co. Ex. 16 | Co. Ex. 17 | Co. Ex. 18 | Co. Ex. 19 | Co. Ex. 20 | Co. Ex. 21 |
| | | Base Paint No. | | | | | | | | | |
| | | B-1 | B-2 | B-3 | B-4 | B-5 | B-6 | B-7 | B-8 | B-9 | B-10 |
| Color of Colored Coating Film Obtained by Applying | $L^*$ | 90.86 | 90.86 | 90.86 | 90.86 | 85.42 | 62.73 | 87.58 | 89.32 | 52.37 | 90.86 |
| | $a^*$ | −0.88 | −0.88 | −0.88 | −0.88 | −6.32 | 40.87 | −9.04 | −8.38 | 52.54 | −0.88 |

TABLE 4-continued

| | | Example No. | | | | | | | | | |
|---|---|---|---|---|---|---|---|---|---|---|---|
| | | Co. Ex. 12 | Co. Ex. 13 | Co. Ex. 14 | Co. Ex. 15 | Co. Ex. 16 | Co. Ex. 17 | Co. Ex. 18 | Co. Ex. 19 | Co. Ex. 20 | Co. Ex. 21 |
| | | | | | | Base Paint No. | | | | | |
| | | B-1 | B-2 | B-3 | B-4 | B-5 | B-6 | B-7 | B-8 | B-9 | B-10 |
| Colored Paint (X) | b* | 0.27 | 0.27 | 0.27 | 0.27 | −3.00 | −7.58 | 53.23 | −9.68 | 53.91 | 0.27 |
| Film Thickness of Base Paint (μm) | | 15 | 15 | 15 | 15 | 15 | 15 | 15 | 15 | 15 | 15 |
| Y5 Value | | 368 | 241 | 441 | 200 | 147 | 281 | 311 | 250 | 90 | 136 |
| Y10 Value | | 214 | 173 | 278 | 151 | 117 | 207 | 221 | 182 | 62 | 125 |
| Y5/Y10 | | 1.72 | 1.39 | 1.59 | 1.32 | 1.26 | 1.36 | 1.41 | 1.37 | 1.45 | 1.09 |
| HG Value | | 69.0 | 42.5 | 69.2 | 35.5 | 35.1 | 51.1 | 32.1 | 54.2 | 59.9 | 72.3 |

Evaluation of Coating Film

The test plates obtained in the manner described above were evaluated based on the following criteria. Tables 3 and 4 show the results.

Value Y Representing Luminance

The strength of the multi-reflection light of the illuminated light is represented by value Y, which represents a luminance in the XYZ color space. In particular, in this specification, the evaluation is made based on value Y5 and value Y10, i.e., the luminance of an angle deviated by 5° with respect to the specular reflection light in the incident direction and an angle deviated by 10° with respect to the specular reflection light in the incident direction, which are characteristics of pearl luster.

The luminance change depending on the observation angle is defined by the value obtained by dividing Y5 by Y10.

Y5: A luminance value Y (Y5) in the XYZ color space was calculated based on a spectral reflectance of light illuminated at an angle of 45 degrees with respect to a coating film and received at an angle of 5 degrees deviated from the specular reflection light in the incident light direction. The measurement and the calculation were performed using Gonio meter GCMS-4 (trade name, Murakami Color Research Laboratory Co., Ltd.).

Y10: A luminance value Y (Y10) in the XYZ color space was calculated based on a spectral reflectance of light illuminated at an angle of 45 degrees with respect to a coating film and received at an angle of 10 degrees deviated from the specular reflection light in the incident light direction. The measurement and the calculation were performed using Gonio meter GCMS-4 (trade name, Murakami Color Research Laboratory Co., Ltd.).

Graininess

The graininess is expressed as a hi-light graininess value (hereinafter abbreviated as the "HG value"). The HG value is a parameter of micro-brilliance, which is a texture obtained by microscopic observation, and indicates the graininess in the highlight (when the coating film is observed from near specular reflection with respect to the incident light). An image of the coating film at an incident angle of 15° and a receiving angle of 0° is taken using a CCD camera, and the obtained digital image data, i.e., two-dimensional lightness distribution data is subjected to Fourier transformation, thereby obtaining a power spectrum image. Subsequently, only the spatial frequency domain corresponding to graininess is extracted from the obtained power spectrum image to calculate a measurement parameter, and the obtained measurement parameter is converted into a numeric value in the range of 0 to 100 in such a manner that the numeric value is directly proportional to the graininess. This numeric value is an HG value. An HG value of 0 indicates no graininess of the effect pigment at all, and an HG value of 100 indicates the highest graininess of the effect pigment.

The embodiments and Examples of the present invention are described in detail above. However, the present invention is not limited to the above-mentioned embodiments, and various modifications can be made based on the technical idea of the present invention.

For instance, the structures, methods, steps, shapes, materials, and values described in the embodiments and Examples above are merely examples, and different structures, methods, steps, shapes, materials, and values may also be used as necessary.

Additionally, the structures, methods, steps, shapes, materials, and values described in the embodiments may be interchangeably combined without departing from the spirit and principal concepts of the present invention.

Furthermore, the present invention can also use the following structures.

Item 1. An effect pigment dispersion comprising water, a rheology control agent (A), and a flake-effect pigment (B),
the flake-effect pigment (B) being an interference pigment in which a transparent or translucent substrate is coated with a metal oxide, and
the solids content of the effect pigment dispersion being 0.1 to 15 mass %.

Item 2. The effect pigment dispersion according to Item 1, wherein the flake-effect pigment (B) is contained in an amount of 30 to 90 parts by mass, based on 100 parts by mass, which is the total solids content, of the effect pigment dispersion.

Item 3. The effect pigment dispersion according to Item 1 or 2, wherein the rheology control agent (A) is a cellulose nanofiber (A-1).

Item 4. The effect pigment dispersion according to Item 3, wherein the rheology control agent (A) contains at least one neutralizer selected from the group consisting of quaternary ammonium salts, alkylamines, and alcohol amines.

Item 5. The effect pigment dispersion according to any one of Items 1 to 4, further comprising a surface adjusting agent (C).

Item 6. The effect pigment dispersion according to Item 5, wherein the surface adjusting agent (C) has a contact angle of 8 to 20° with respect to a tin plate (produced by Paltek Corporation), the contact angle being measured in such a manner that a liquid that is a mixture of isopropanol, water, and the surface adjusting agent (C) at a ratio of 4.5/95/1 is adjusted to have a viscosity of 150 mPa·s measured with a Brookfield-type viscometer at a rotor rotational speed of 60 rpm at a temperature of 20° C., 10 μL of the liquid is added dropwise to a tin plate degreased in advance, and the contact angle with respect to the tin plate is measured 10 seconds after the dropping.

Item 7. The effect pigment dispersion according to any one of Items 1 to 6, wherein, based on the effect pigment dispersion, the rheology control agent (A) is contained, as a solids content, in an amount of 0.01 to 5 mass %, preferably 0.5 to 3 mass %, more preferably 0.1 to 2 mass %, the flake-effect pigment (B) is contained, as a solids content, in an amount of 0.1 to 5 mass %, preferably 0.2 to 4.5 mass %, more preferably 0.5 to 4 mass %, and the surface adjusting agent (C) is contained, as a solids content, in an amount of 0 to 5 mass %, preferably 0 to 3 mass %, more preferably 0.1 to 3 mass %.

Item 8. A method for forming a coating film, comprising applying the effect pigment dispersion according to any one of Items 1 to 7, thereby forming an effect coating film.

Item 9. A method for forming a multilayer coating film, comprising applying a colored paint (X) onto a substrate to form a colored coating film, applying the effect pigment dispersion according to any one of Items 1 to 7 onto the colored coating film to form an effect coating film, applying a clear paint (Z) onto the effect coating film to form a clear coating film, and heating and curing the three coating films.

Item 10. A method for forming a multilayer coating film, comprising applying a colored paint (X) onto a substrate to form a colored coating film, applying the effect pigment dispersion according to any one of Items 1 to 7 onto the colored coating film to form an effect coating film, and applying a clear paint (Z) onto the effect coating film to form a clear coating film, the multilayer coating film to be obtained being such that a value Y5/Y10, which is obtained by dividing a value Y (Y5) representing a luminance in the XYZ color space based on the spectral reflectance of light illuminated at an angle of 45 degrees with respect to the coating film and received at an angle of 5 degrees deviated from the specular reflection light in the incident light direction by a value Y (Y10) representing a luminance in the XYZ color space based on the spectral reflectance of light illuminated at an angle of 45 degrees with respect to the coating film and received at an angle of 10 degrees deviated from the specular reflection light in the incident light direction, falls within a range of 1.5 to 3.0, and that an HG value, which represents microscopic brilliance, falls within 20 to 60.

Item 11. The method for forming a multilayer coating film according to Item 9 or 10, wherein the clear paint (Z) is a two-component clear paint containing a hydroxy-containing resin and a polyisocyanate compound.

INDUSTRIAL APPLICABILITY

The effect pigment dispersion and the method for forming a multilayer coating film of the present invention can be applied to various industrial products, particularly interior and exterior panels of automobile bodies, and automobile components.

The invention claimed is:

1. An effect pigment dispersion comprising water, a rheology control agent (A), and a flake-effect pigment (B),
   the rheology control agent (A) including a cellulose nanofiber,
   the flake-effect pigment (B) being an interference pigment in which a transparent or translucent substrate is coated with a metal oxide, and
   the effect pigment dispersion having a solids content in the range of 0.1 to 15 mass %.

2. The effect pigment dispersion according to claim 1, wherein the flake-effect pigment (B) is contained in an amount of 30 to 90 parts by mass, based on 100 parts by mass, which is total solids content, of the effect pigment dispersion.

3. The effect pigment dispersion according to claim 1, wherein the rheology control agent (A) further contains at least one neutralizer selected from the group consisting of quaternary ammonium salts, alkylamines, and alcohol amines.

4. The effect pigment dispersion according to claim 1, further comprising a surface adjusting agent (C).

5. The effect pigment dispersion according to claim 4, wherein the surface adjusting agent (C) has a contact angle of 8 to 20° with respect to a tin plate, the contact angle being measured in such a manner that a liquid that is a mixture of isopropanol, water, and the surface adjusting agent (C) at a ratio of 4.5/95/1 is adjusted to have a viscosity of 150 mPa·s measured with a Brookfield-type viscometer at a rotor rotational speed of 60 rpm at a temperature of 20° C., 10 μL of the liquid is added dropwise to a previously degreased tin plate, and the contact angle with respect to the tin plate is measured 10 seconds after the dropping.

6. The effect pigment dispersion according to claim 1, wherein the effect pigment dispersion has a solids content in the range of 0.1 to 5 mass %.

7. A method for forming a coating film, comprising applying the effect pigment dispersion according to claim 1, thereby forming an effect coating film.

8. A method for forming a multilayer coating film, comprising applying a colored paint (X) onto a substrate to form a colored coating film, applying the effect pigment dispersion according to claim 1 onto the colored coating film to form an effect coating film, applying a clear paint (Z) onto the effect coating film to form a clear coating film, and heating and curing the three coating films.

9. The method for forming a multilayer coating film according to claim 8, wherein the clear paint (Z) is a two-component clear paint containing a hydroxy-containing resin and a polyisocyanate compound.

10. A method for forming a multilayer coating film, comprising applying a colored paint (X) onto a substrate to form a colored coating film, applying the effect pigment dispersion according to claim 1 onto the colored coating film to form an effect coating film, and applying a clear paint (Z) onto the effect coating film to form a clear coating film, the multilayer coating film to be obtained being such that a value Y5/Y10, which is obtained by dividing a value Y (Y5) representing a luminance in the XYZ color space based on the spectral reflectance of light illuminated at an angle of 45 degrees with respect to the coating film and received at an angle of 5 degrees deviated from the specular reflection light in the incident light direction by a value Y (Y10) representing a luminance in the XYZ color space based on the spectral reflectance of light illuminated at an angle of 45 degrees with respect to the coating film and received at an angle of 10 degrees deviated from the specular reflection light in the incident light direction, falls within a range of 1.5 to 3.0, and that an HG value, which represents microscopic brilliance, falls within 20 to 60.

* * * * *